Patented Dec. 28, 1926.

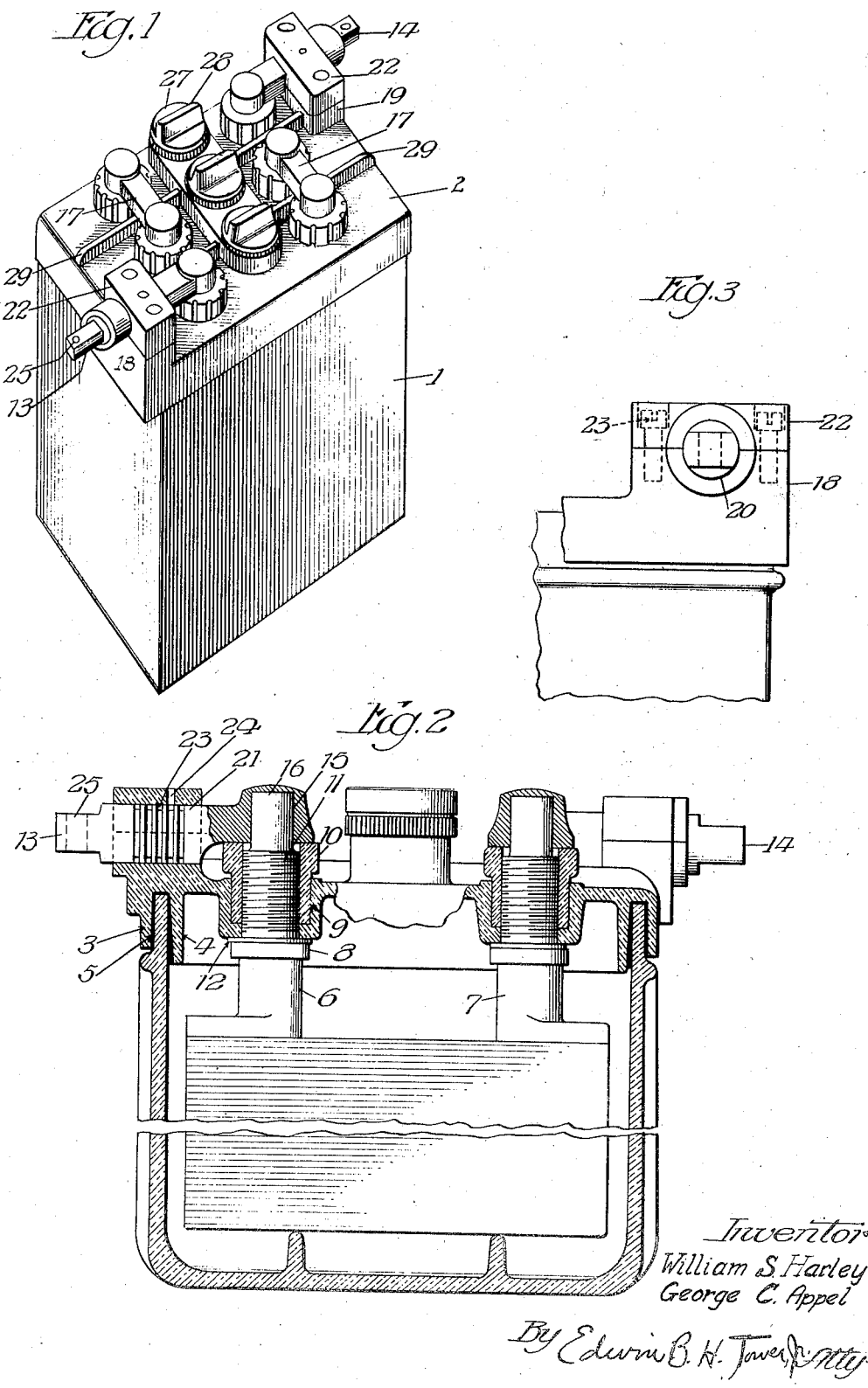

1,611,908

UNITED STATES PATENT OFFICE.

WILLIAM S. HARLEY AND GEORGE C. APPEL, OF MILWAUKEE, WISCONSIN, ASSIGNORS TO HARLEY-DAVIDSON MOTOR CO., OF MILWAUKEE, WISCONSIN, A CORPORATION OF WISCONSIN.

STORAGE BATTERY.

Application filed June 29, 1923. Serial No. 648,503.

This invention relates to a storage battery.

It relates more particularly to the terminals and plate supports for a storage battery by which the plates are suspended directly from the top of the battery.

This construction is especially adapted for use where excessive vibration must be withstood such as on motorcycles and other vehicles, but, of course, it is not limited to such use.

Heretofore, considerable trouble has been experienced in batteries used on motorcycles due to the battery plates becoming loosened and the terminal wires corroding and breaking from the battery terminals under the vibration to, which the batteries are subjected.

An object of this invention is to provide a storage battery having improved means for securing the plates thereto.

Another object is to provide a storage battery terminal which is strong and rigid.

Another object is to securely anchor the battery terminal to the battery casing.

Another object is to provide a storage battery terminal in which creepage of the electrolyte therealong is prevented.

Another object is to prevent corrosion of the terminal connections.

Other objects and advantages will hereinafter appear.

In accordance with this invention, the cover of the battery is provided with a depression around each of the terminal posts for the reception of an elongated nut to securely clamp the terminal posts to the cover.

The terminals which are composed of lead or similar material and fused on to the terminal posts are rigidly secured to the cover by caps which fit thereover and clamp the terminals tightly against the cover.

A series of oil grooves are provided in the terminals which may be filled with oil or grease to prevent the electrolyte from creeping therealong and coming into contact with the copper or brass terminal connections and causing the same to corrode.

A small opening in the cap communicates with the oil grooves by which additional oil may be supplied thereto when necessary.

An embodiment of the invention is illustrated in the accompanying drawings in which:

Fig. 1 is a perspective view of a battery casing provided with a cover embodying this invention.

Fig. 2 is a vertical section through the battery and cover.

Fig. 3 is a vertical elevation of the terminal clamping members.

Fig. 1 shows a three-cell battery having a casing 1 and a cover 2 made of hard rubber or other suitable material.

The cover is provided with external and internal flanges 3 and 4 between which the upper end 5 of the casing 1 is received.

Suitable adhesive material is applied to the flanges 3 and 4 to securely hold the cover in position on the casing and to provide a seal therefor, whereby the escape of the electrolyte is prevented.

The positive and negative plates of each cell are carried by leaden terminal posts 6 and 7 respectively. These posts pass through the top or cover of the battery and support the plates therefrom. For this purpose each of the posts has a flange 8 thereon, which is drawn tightly against the bottom of a depression 9 in the cover by a clamping nut 10 threaded on the outer end 11 thereof.

The depression 9 permits the use of a relatively long nut having a large surface of engagement with the threads of the terminal posts, thus opposing any tendency of the nuts working loose due to vibration or other shocks or jars, and insuring that the plates will be maintained rigid with the cover.

A compressible washer 12, preferably of rubber, is interposed between the flange and the bottom of the cover to insure a seal therebetween.

A pair of leaden terminals 13 and 14 are provided for the positive and negative terminal posts of the battery. Each terminal has an opening 15 in one end thereof through which the end 16 of a terminal post extends and is secured in any suitable manner as by fusing or burning.

The cells are connected in series by a pair of terminal post connectors 17 secured to the terminal posts in the same manner as the terminals 13 and 14. In assembling the battery the terminal posts are extended through the openings in the cover and the nuts 10 screwed down tightly. The terminals 13 and 14 and connectors 17 are then passed over the reduced ends of the terminal posts and pressed tightly against the upper face of the nuts 10 and fused to the posts. The terminals and terminal post connectors thus lock the nuts securely to the posts and prevent any tendency of their working loose.

The cover plate 2 at diametrically opposite corners has a pair of upward projections 18 and 19 in which semi-cylindrical channels 20 are provided for the reception of the cylindrical portion 21 of the terminals.

Caps 22 fit over the terminals and are provided with cap screws 23 for clamping the terminals securely against the cover.

Each terminal has a series of oil grooves 23 in that portion thereof within the cap 22, which grooves may be filled with oil or grease.

The grooves retain the oil or grease and form a seal between the terminal and cover preventing the electrolyte from creeping along the terminal and reaching the outer end thereof, where it would cause corrosion of the conductor connected thereto.

An opening 24 in the cap 22 permits additional oil to be supplied to the grooves 23 at necessary periods.

The terminals are provided with openings 25 in their outer ends by which conductors may be secured thereto.

The cover has centrally thereof a transversely extending raised portion 26 in which the filler openings are formed. These openings are closed by plugs 27 having lugs 28 to facilitate removal thereof.

Ribs 29 extend longitudinally of the cover between each pair of cells to prevent any electrolyte which may be splashed or spilled onto the cover from forming a connection between adjacent terminal posts of the different cells.

By clamping the terminals to the cover, it is impossible for the terminals to vibrate with respect to the terminal posts, and therefore any tendency for them to become detached from the terminal posts either through vibration or accident is eliminated.

The terminals extend a substantial distance outside of the battery casing which readily permits inspection thereof, and the clamping members 18 and 22 co-operating with the oil grooves, prevents the electrolyte from coming into contact with the terminal connection to cause corrosion thereof.

Obviously other structures may be devised which will embody the invention set forth herein.

What we claim is:

1. A storage battery having a casing provided with an upward projection, a cap therefor, a terminal between said projection and said cap, said terminal being provided with a groove to prevent creepage of electrolyte along said terminal, and means to fasten said cap to said projection to hold said terminal in position.

2. A storage battery having a terminal post, a terminal member secured thereto, said terminal member having means formed therein for the convenient connection of an electrical conductor and having intermediate of said means and said post a portion for retaining oil or the like for preventing the creepage of electrolyte, said storage battery being provided with a holder operative upon said terminal member between said means and said post for holding said terminal member against vibration.

3. A storage battery having a terminal post and a terminal member secured thereto, said terminal member having a portion formed for the convenient attachment of an electrical conductor, said member being formed intermediate of its ends with oil retaining grooves for preventing the spread of electrolyte along said terminal member, said storage battery being provided with holding means operative upon said terminal member and having the dual function of securing said terminal member against vibration and retaining oil within said grooves.

4. A storage battery having a cover, plates supported by said cover, said plates having a terminal post extending through said cover, said post being screw-threaded and being provided with a relatively long clamping nut for securing said post in position, and a terminal member secured to said post and having bearing engagement with said nut, whereby to prevent said nut from turning, said storage battery being provided with means for clamping said terminal member intermediate of its length for preventing vibration of said terminal member, said terminal member being provided with means for retaining oil or the like to prevent the creepage of electrolyte, said means being disposed in position to be protected by said clamping means.

5. A storage battery having a cover, plates supported by said cover, said plates having a terminal post extending through said cover, said post being screw-threaded and being provided with a relatively long clamping nut for securing said post in position, and a terminal member secured to said post, said storage battery being provided with means for clamping said terminal member intermediate of its length for preventing vibration of said terminal member, said terminal member being provided with means for retaining oil or the like to prevent the creepage of electrolyte, said means being disposed in position to be protected by said clamping means.

WILLIAM S. HARLEY.
GEORGE C. APPEL.